(12) United States Patent
Terao et al.

(10) Patent No.: US 7,187,844 B1
(45) Date of Patent: Mar. 6, 2007

(54) INFORMATION RECORDING APPARATUS (75) Inventors: Kyoichi Terao, Tokorozawa (JP);
Hiroshi Iwamura, Tokorozawa (JP);
Shigeru Adachi, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 1442 days.

(21) Appl. No.: 09/627,304

(22) Filed: Jul. 27, 2000

(30) Foreign Application Priority Data

Jul. 30, 1999 (JP) .............................. P11-217321

(51) Int. Cl.
*H04N 5/93* (2006.01)
(52) U.S. Cl. ..................... 386/56; 386/46; 369/47.33
(58) Field of Classification Search .................. 386/1, 386/21, 45, 46, 52, 53, 56, 113, 125, 12, 126; 360/7; 369/47.14, 53, 47.33, 47.54, 30.23
See application file for complete search history.

(56) References Cited

U.S. PATENT DOCUMENTS

| | | | | |
|---|---|---|---|---|
| 4,992,891 A | * | 2/1991 | Komatsu et al. | ............... 386/56 |
| 5,420,838 A | * | 5/1995 | Maeda et al. | ............. 369/47.14 |
| 5,463,607 A | * | 10/1995 | Roth et al. | ................ 369/47.33 |
| 5,504,728 A | | 4/1996 | Yokota et al. | |
| 6,388,968 B1 | * | 5/2002 | Ohta et al. | ................ 369/53.45 |
| 6,584,053 B1 | * | 6/2003 | Tsukihashi | ................ 369/53.34 |

FOREIGN PATENT DOCUMENTS

| | | |
|---|---|---|
| EP | 0 843 311 A2 | 5/1998 |
| EP | 0 926 670 A2 | 6/1999 |
| JP | 59-014106 | 1/1984 |
| WO | WO 97/46027 | 12/1997 |

* cited by examiner

*Primary Examiner*—James J. Groody
*Assistant Examiner*—Christopher Onuaku
(74) *Attorney, Agent, or Firm*—Morgan Lewis & Bockius LLP (57) ABSTRACT

An information recording apparatus include: a processing unit for processing recording information to be recorded and for generating processed information; a storage unit for temporarily storing the processed information; a recording unit for recording the processed information onto an information storage medium; a position storing unit for storing, at a time of interrupting recording of the processed information, an interruption storage position which is a storage position in the storage unit of the processed information corresponding to a timing at which interruption is instructed; an interrupting unit for interrupting recording of the processed information after storing the interruption storing position; and a restart unit for restarting the recording of the processed information based on the stored interruption storage position.

7 Claims, 9 Drawing Sheets

INFORMATION RECORDING APPARATUS

BACKGROUND OF THE INVENTION

1. Field of the Invention

This invention relates to an information recording apparatus, and more particularly to recording interruption control and recording restarting control at the time of interrupting and restarting information recording onto an information storage medium.

2. Description of Related Art

Audio information such as voices and/or music are sometimes recorded, together with corresponding video information, on an information storage medium such as an optical disc after they are compressed. If the recording is temporarily interrupted or stopped during the information recording in response to a temporary recording stop instruction, the extraction of audio information to be recorded is stopped after the reception of the instruction. When the recording restart instruction is received, the extraction of the audio information to be recorded is restarted at the time of the restart instruction to restart the information recording.

According to a conventional control method of the recording interruption and restart which controls extraction state of the audio information to be recorded, if data to be recorded at the time of interruption and restart have large level difference therebetween and the audio information including the interrupted portion is continuously reproduced, a sudden noise may possibly occur at the interruption timing.

In order to overcome this problem, fade-out and fade-in processing are introduced. Namely, at the time of interruption of recording, the audio information to be recorded is faded out after the recording interruption instruction is received. At the time of restarting recording, the audio information to be recorded is faded in after the recording restart instruction is received. Thus, the audio information level at the recording interruption time and the recording restart time are made substantially zero level. Here, "fade-out" is processing which gradually decreases the recording level of audio information finally down to zero level, and "fade-in" is processing which sets the recording level of audio information to zero at first and then gradually increases the recording level up to a normal level.

When audio information is recorded on an information storage medium together with video information corresponding, on time axis basis, to the audio information and the recording is temporarily interrupted and then restarted, it is generally possible to interrupt recording video information immediately after the interruption instruction and to restart the recording video information immediately after the restart instruction. If the video signal recorded before and after the interruption is reproduced, unlike the above mentioned audio information, no noise is introduced to the reproduced video image.

If only the audio information corresponding to the video information is faded out to suppress the noise at the time of interruption, the corresponding video information is not recorded during the fade-out period of the audio information. If the reproduction of the video information and the audio information is restarted after the interruption, the video information is recorded from the position on the storage medium where the video information corresponding to the audio information is interrupted, and audio information is recorded from the position just after the audio information which was faded-out at the time of interruption. As a result, the audio information and the video information are not recorded in correspondence with each other. If the audio information and the video information are reproduced from the position of the interruption to the position of the restart, there is a problem that the audio information and the video information are reproduced in a manner being timely shifted from each other. More specifically, the audio information is reproduced with time lag from the reproduction of the video information. Further, this leads to such a problem that it is impossible to record the audio information and the video information according to common time-information.

SUMMARY OF THE INVENTION

It is an object of the present invention to provide an information recording apparatus which can record audio information, with maintaining the continuity in reproduction of the recorded video and audio information if the recording is once interrupted and then restarted, and with suppressing the noise generation at the time of reproducing audio information recorded during the interruption and restart.

According to one aspect of the present invention, there is provided an information recording apparatus including: a processing unit for processing recording information to be recorded and for generating processed information; a storage unit for temporarily storing the processed information; a recording unit for recording the processed information onto an information storage medium; a position storing unit for storing, at a time of interrupting recording of the processed information, an interruption storage position which is a storage position in the storage unit of the processed information corresponding to a timing at which interruption is instructed; an interrupting unit for interrupting recording of the processed information after storing the interruption storage position; and a restart unit for restarting the recording of the processed information based on the stored interruption storage position.

In accordance with the information recording apparatus thus configured, the interruption storage position is stored and the recording of the processed information is restarted based on the interruption storage position. Therefore, when the processed information recorded before and after the interruption/restart is reproduced, the processed information may be reproduced with maintaining its continuity.

The position storing unit may store the storage position in the storage unit of the processed information inputted to the storage unit at interruption instruction timing as the interruption storage position. By this, since the recording of the processed information is restarted based on the storage position of the processed information inputted at the interruption instruction timing, the processed information may be recorded with accurately maintaining the continuity at the time of reproduction.

The processing unit may fade out the recording information after the interruption instruction timing to generate the processed information, the storage unit may store the generated processed information onto an area in the storage unit where the processed information is to be stored after the interruption instruction timing, and the interrupting unit may read out the fading-out processed information from the storage unit and store the processed information onto the information storage medium, and then interrupt the recording of the processed information. By this, after the interruption timing, the recording of the processed information is interrupted after it is faded-out. Therefore, when the processed information before and after the interruption timing is reproduced, the noise generation may be suppressed.

The restart unit restarts, after the interruption instruction timing, the recording of the processed information from restart processed information which is the processed information to be recorded after the recording of the processed information is interrupted. By this, after the interruption instruction timing and before the actual interruption of the recording, no other processed information is recorded over the processed information to be recorded. Therefore, when the processed information before and after the interruption/restart is reproduced, the noise may be reliably suppressed.

The restart unit restarts the recording of the processed information by fading in the restart processed information to be recorded on the information storage medium. By this, since the recording is restarted after the restart processed information is faded-in, the noise generation may be further suppressed.

The restart unit restarts the recording of the processed information from interruption processed information which is to be recorded after the interruption instruction timing. By this, since the recording of the processed information is restarted from the interruption processed information, the interruption processed information is also recorded in addition to the processed information corresponding to the time period from the interruption instruction timing to the actual interruption of the recording. Therefore, it is possible to avoid that the reproduction level of the processed information is zero level and the reproduction break takes place.

The restart unit restarts the recording of the processed information by fading in the interruption processed information to be recorded on the information storage medium. By this, the recording interruption and restart are carried out by so-called cross-fade. Hence, it is possible to avoid the reproduction level of the processed information becoming zero level to break the reproduction, and to reduce noise.

The recording information may be audio information which is to be recorded on the information storage medium together with corresponding video information. Therefore, it is possible to avoid the time shift between the video information and audio information at the time of reproduction, and the continuity of the video and audio information may be ensured during the recording interruption and restart.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings. It is noted that the following embodiments are directed to the case where the present invention is applied to the audio information recording by an information recording apparatus which records audio information and video information on an optical disc.

[I] 1st Embodiment

Figure 1:
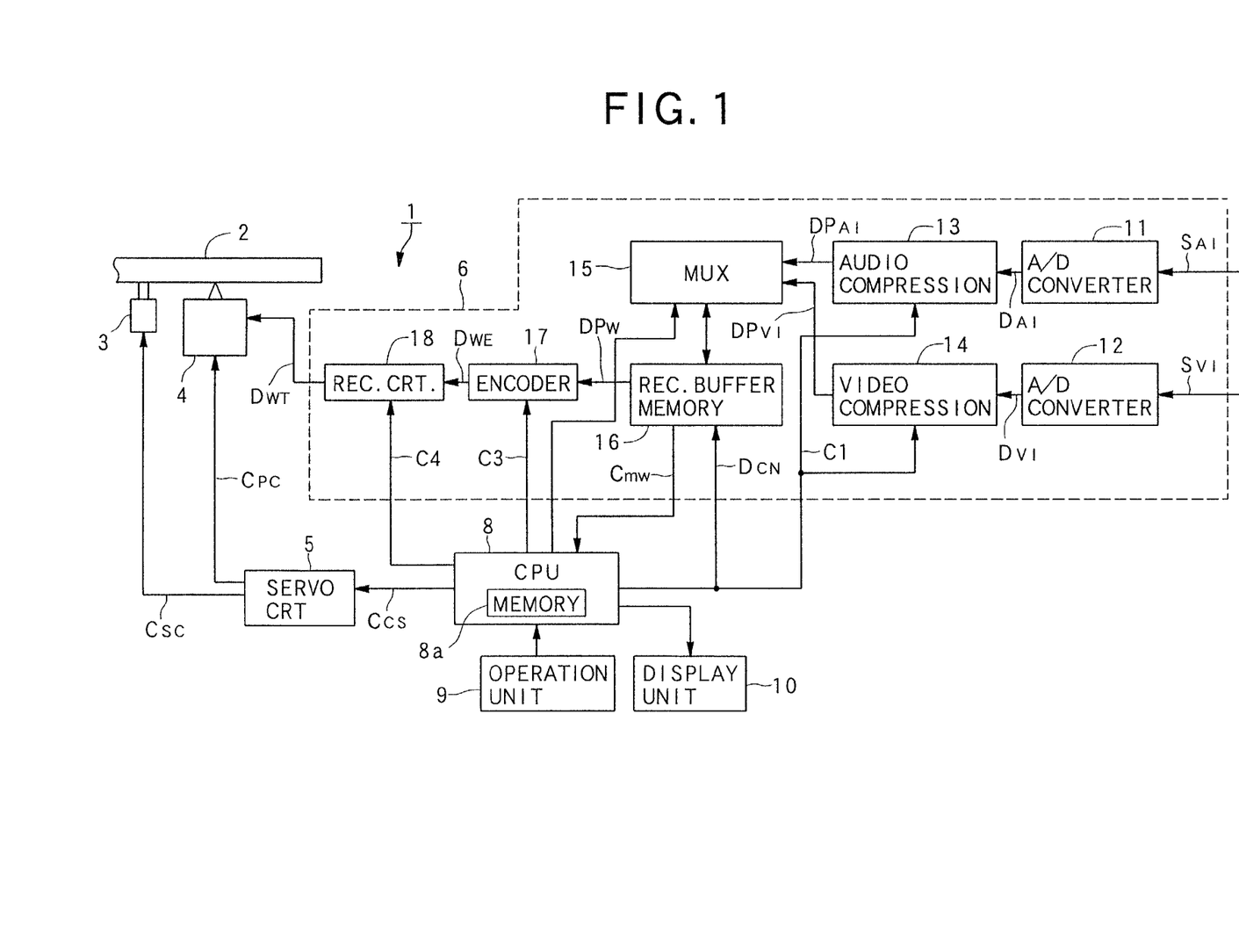
FIG. 1 is a block diagram showing schematic configuration of an information recording apparatus according to the present invention.

The first embodiment of the present invention will be described with reference to FIGS. 1 to 6. First of all, the configuration and rough operation of the information recording apparatus will be described with reference to FIGS. 1 to 3. FIG. 1 is a block diagram showing the schematic configuration of the information recording apparatus according to the present invention.

As seen in FIG. 1, the information recording apparatus 1 includes a spindle motor 3 for rotating an optical disc 2, a pickup 4 for optically recording data $D_{WT}$ onto the optical disc 2, a servo circuit 5 for performing servo control of the spindle motor 3 and the pickup 4, a recording system 6 for generating the recording data $D_{WT}$ to be recorded on the optical disc 2, a central processing unit (CPU) 8 for performing overall control of the information recording circuit 1, an operation unit 9 which is used by a user to input necessary recording interruption/restart instruction to the central processing unit 8, and a display unit 10.

The recording system 6 includes an A/D converters 11, 12, an audio compression circuit 13, a video compression circuit 14, a multiplexing circuit 15, a recording buffer memory 16, an encoder 17 and a recording circuit 18. The central processing unit 8 includes a memory 8a for storing preset system program and the like, and is constituted by a microprocessor for controlling the overall operation of the information recording apparatus 1 by executing the system program.

Next, the rough operation of the recording system 6 will be described. First, the A/D converter 11 converts the analog audio signal $S_{AI}$, supplied from outside, to the digital audio data $D_{AI}$, and outputs it to the audio compression circuit 13. The audio compression circuit 13 compresses the audio data $D_{AI}$ according to the data compression system designated by the control signal C1 from the central processing unit 8 to produce the compressed audio data $DP_{AI}$, and outputs it to the multiplexing circuit 15. The detailed configuration and operation of the audio compression circuit 13 will be described later.

Simultaneously, the A/D converter 12 converts the analog video signal $S_{VI}$, supplied from outside, to the digital video data $D_{VI}$, and outputs it to the video compression circuit 14. The video compression circuit 14 compresses the video data $D_{VI}$ according to the data compression system (e.g., MPEG (Moving Picture Experts Group) designated by the control signal C1 from the central processing unit 8 to produce the compressed video data $DP_{VI}$, and outputs it to the multiplexing circuit 15.

When a user inputs a recording start instruction to the operation unit 9, the multiplexing circuit 15 and the recording buffer memory 16 perform time-division multiplexing of the compressed audio data $DP_{AI}$ and the compressed video data $DP_{VI}$ in accordance with the timing designated by the control signal C2 from the central processing unit 8, produces the multiplexed compressed data $DP_W$, and outputs it to the encoder 17. At this time, the recording buffer memory 16 temporarily stores the compressed audio data $DP_{AI}$ and the compressed video data $DP_{VI}$, and cooperates with the multiplexing circuit 15 to produce the compressed data $DP_W$.

Simultaneously, the recording buffer memory 16 feeds the data amount signal Cmw indicating the data amount (or data length) of the compressed data $DP_W$ produced by the multiplexing circuit 15 to the central processing unit 8. The central processing unit 8 controls the display unit 10 to display the data amount of the compressed data $D_{PW}$, as characters or the like, on the basis of the data amount signal Cmw. Then, the encoder 17 encodes the compressed data $D_{PW}$ on the basis of the control signal C3 supplied from the central processing unit 8 to produce the encoded data $D_{WE}$, and outputs it to the recording circuit 18. The recording circuit 18 applies predetermined processing including amplification onto the encoded data $D_{WE}$ based on the control signal C4 from the central processing unit 8, produces the recording data $D_{WT}$ and outputs it to the pickup 4. Thus, the light source such as a semiconductor laser in the pickup 4 is driven in correspondence with the recording data $D_{WT}$. The recording light beam having the intensity corresponding to the recording data $D_{WT}$ is emitted, and the recording data $D_{WT}$ is optically recorded on the optical disc 2.

Figure 2:
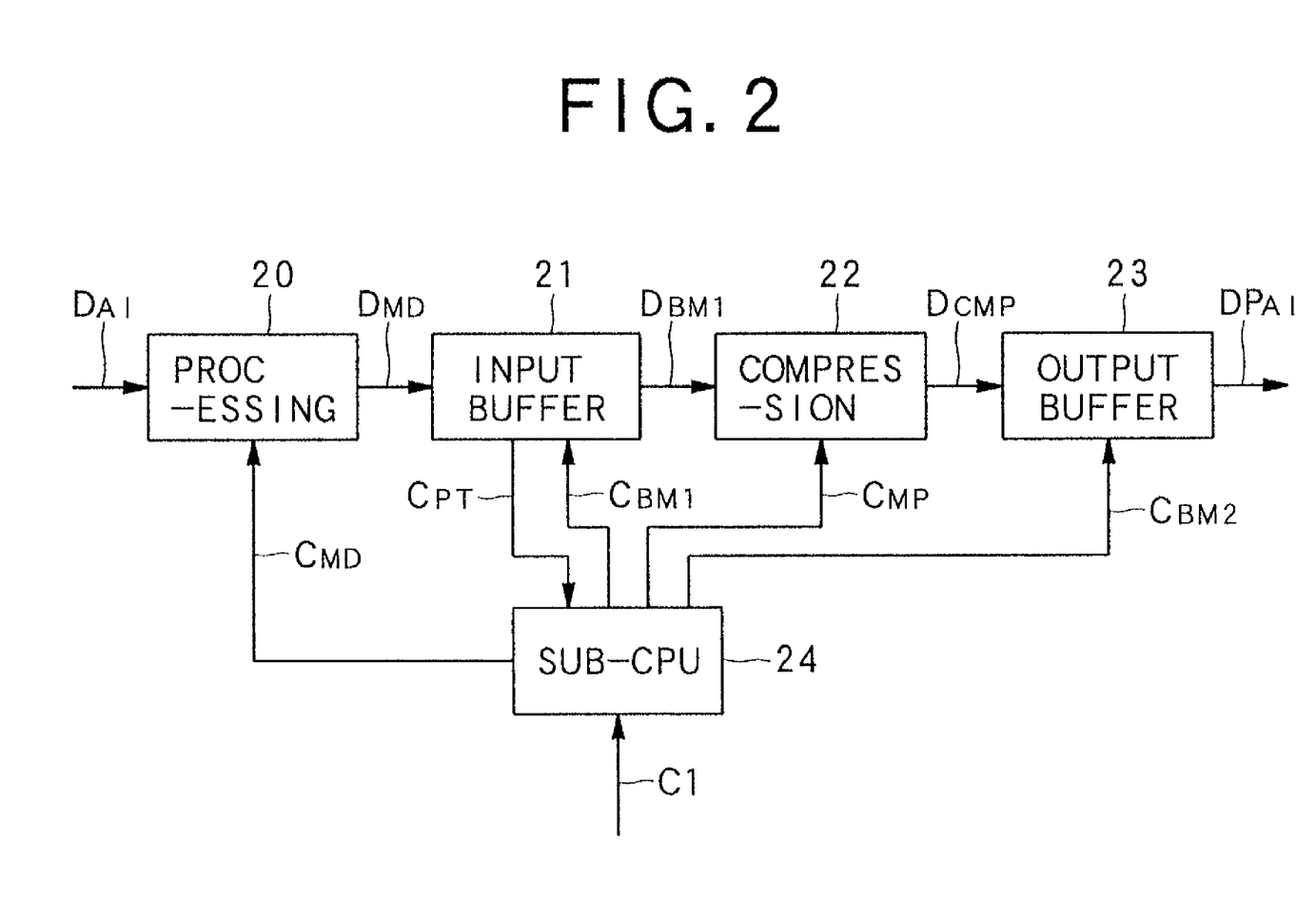
FIG. 2 is a block diagram showing the detailed configuration of the audio compression circuit.
Figure 3:
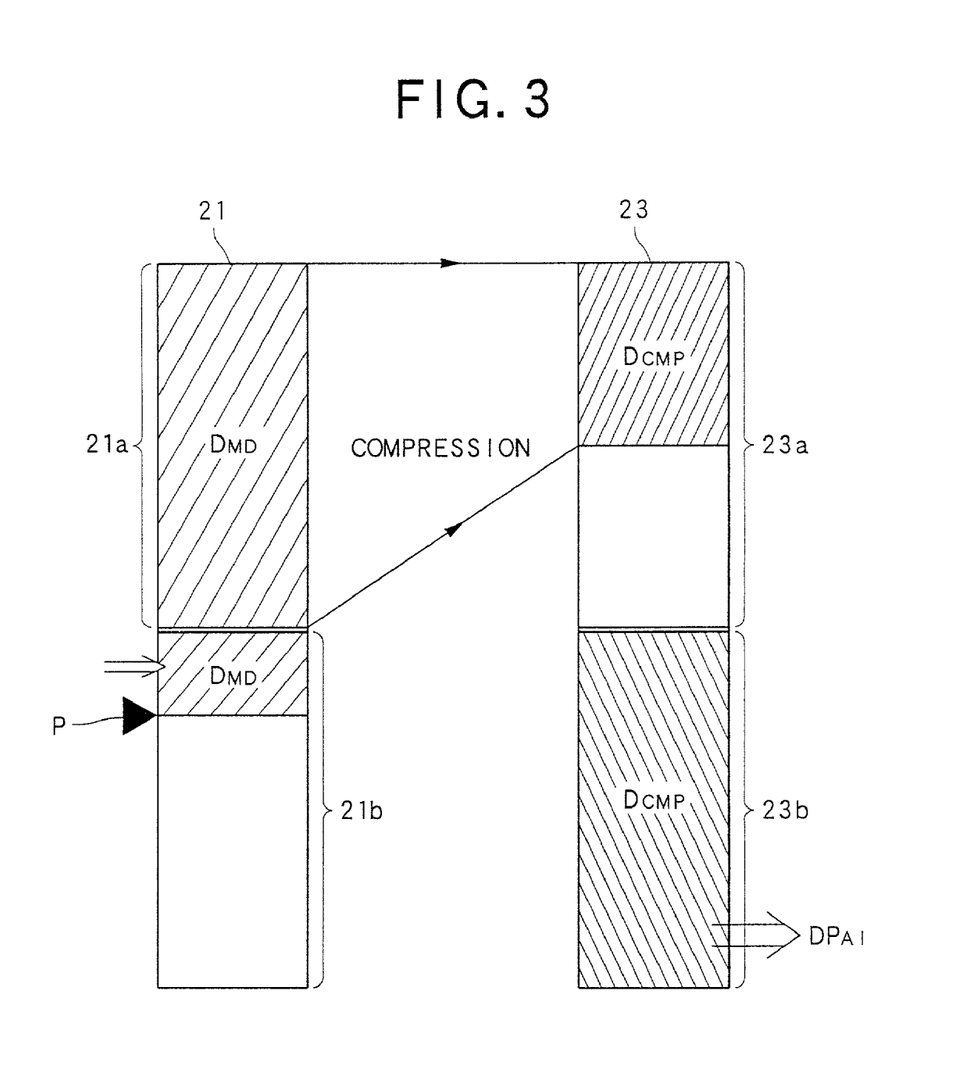
FIG. 3 is a schematic diagram illustrating general operation of the audio compression circuit.

Next, the detailed configuration and general operation of the audio compression circuit 13 will be described with reference to FIGS. 2 and 3. FIG. 2 is a block diagram showing the detailed configuration of the audio compression circuit 13, and FIG. 3 is a schematic diagram illustrating the general operation of the audio compression circuit 13. As shown in FIG. 2, the audio compression circuit 13 includes a processing unit 20, an input buffer memory 21, a compression unit 22, an output buffer memory 23 and a sub-CPU 24.

Next, the operation of the audio compression circuit 13 at the time of normal recording will be described. First, the processing unit 20 applies the fade-out processing and the fade-in processing onto the audio data $D_{AI}$ to produce processed data $D_{MD}$, and outputs it to the input buffer memory 21. The fade-out processing is to gradually decrease the level of the audio data $D_{AI}$ to be zero level, and the fade-in processing is to gradually increase the level of the audio data $D_{AI}$ to be a certain level. It is noted that the audio data $D_{AI}$ is outputted, as it is, to the input buffer memory 21 as processed data $D_{MD}$ if the fade-in processing or the fade-out processing is not applied to the audio data $D_{AI}$. The input buffer memory 21 temporarily stores the processed data $D_{MD}$ based on the control signal $C_{BM1}$ from the sub-CPU 24, and outputs it to the compression unit 22 as the buffer data $D_{BM1}$ at the timing designated by the control signal $C_{BM1}$. The input buffer memory 21 outputs the position of the input pointer P within the input buffer memory 21, indicating the storage amount of the processed data $D_{AI}$ (i.e., storage position of the latest processed data $D_{MD}$) in the input buffer memory 21 to the sub-CPU 24 as the pointer signal $C_{PT}$. The compression unit 22 applies compression processing in accordance with the data compression system designated by the control signal C1 from the central processing circuit 8 onto the buffer data $D_{BM1}$ to produce the compressed data $D_{CMP}$, and outputs it to the output buffer memory 23. The output buffer memory 23 temporarily stores the compressed data $D_{CMP}$ based on the control signal $D_{BM2}$ from the sub-CPU 24, produces the compressed audio data $DP_{AI}$ at the timing designated by the control signal $C_{BM2}$, and outputs it to the multiplexing circuit 15.

Next, the general operation of the buffer memories in the audio compression circuit 13 at the time of the compression processing will be described with reference to FIG. 3. As shown in FIG. 3, the input buffer memory 21 includes two buffer blocks 21a and 21b having the same storage capacity, and the output buffer memory 23 also includes two buffer blocks 23a and 23 having the same storage capacity. At the time of normal recording, the processed data $D_{MD}$ is accumulated in the buffer block 21a. When the buffer block 21a becomes full, the compression unit 22 applies compression onto the processed data $D_{MD}$ in the buffer block 21a, and the compressed data $D_{CMP}$ thus produced is accumulated in the buffer block 23a. At this time, the compressed data $D_{CMP}$ already accumulated in the buffer block 23b (which was produced from the processed data $D_{MD}$ previously accumulated in the buffer block 21b) is outputted to the multiplexing circuit 15 as the compressed audio data $DP_{AI}$.

Once the buffer block 21a becomes full, the processed data $D_{MD}$ is accumulated in the buffer block 21b. The leading address of the latest storage area storing the processed data $D_{MD}$ (which is updated as the processed data is accumulated), is set as the input pointer P, and outputted to the sub-CPU 24 as the pointer signal $C_{PT}$. The leading address included in the pointer signal $C_{PT}$ is stored in a memory (not shown) within the sub-CPU 24. Thus, in the course of the compression processing by the audio compression circuit 13, the processed data $D_{MD}$ is compressed every time when the buffer block 21a or 21b of the input buffer memory 21 becomes full, and the compressed data is temporarily stored in the corresponding one of the buffer blocks 23a or 23b in the output buffer memory 23. This operation is alternatively carried out. In this operation, the input pointer P always indicates the storage position of the latest processed data $D_{MD}$ in the buffer block 21a or 21b (this storage position will be hereinafter simply referred to as "the pointer-P position").

Figure 4:
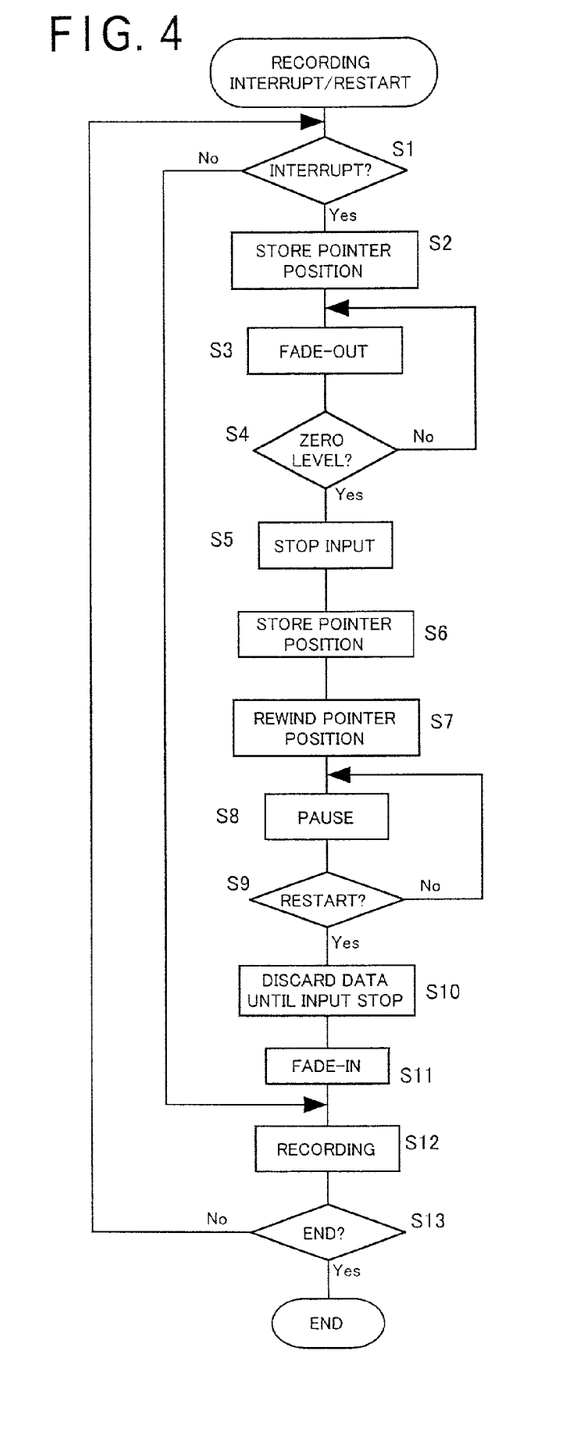
FIG. 4 is a flowchart showing the recording interruption/restart operation.
Figure 5:
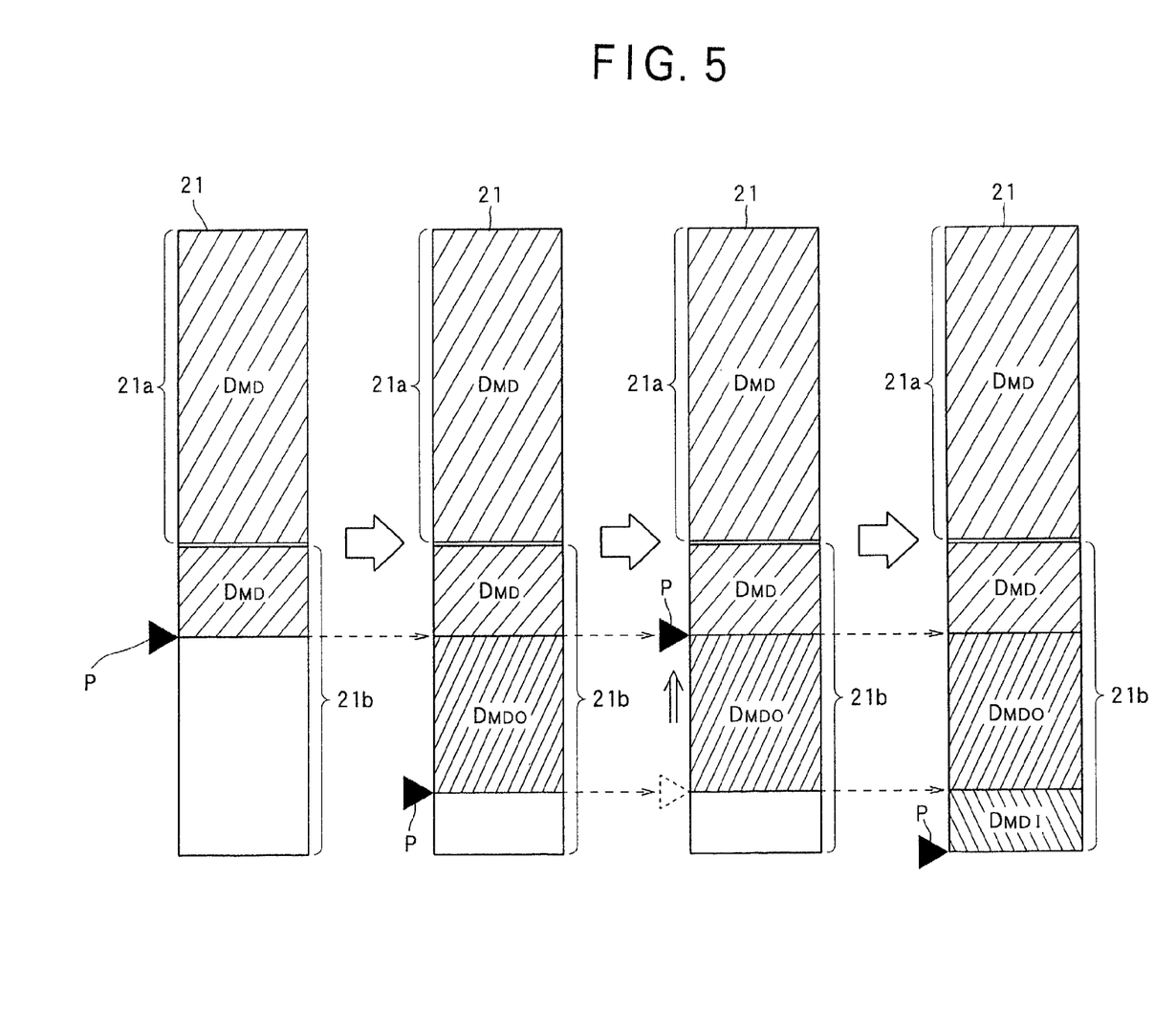
FIG. 5 is a schematic diagram illustrating the state of the input buffer during the recording interruption/restart operation.
Figure 6:
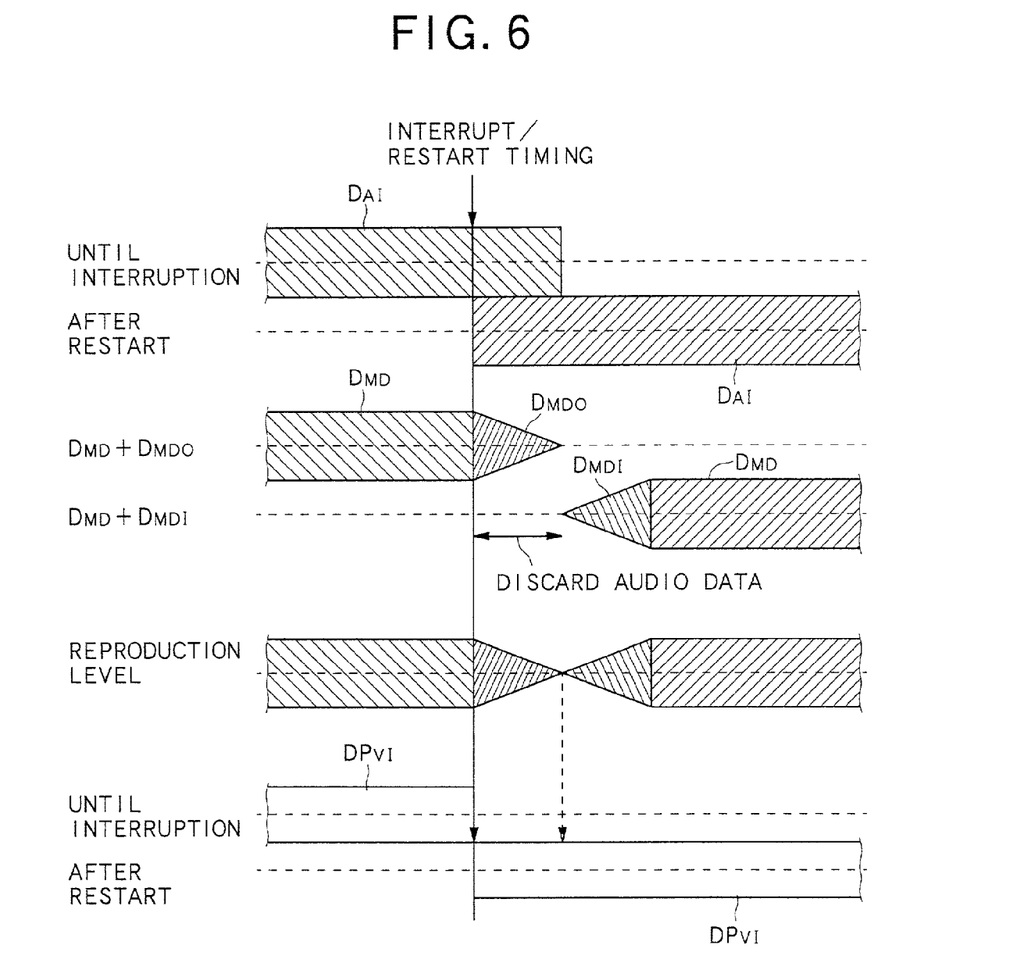
FIG. 6 is a timing chart illustrating data before and after the recording interruption/restart operation.

Next, the recording interruption/restart operation of the audio data $D_{AI}$ performed by the audio compression circuit 13 will be described with reference to FIGS. 4 to 6. FIG. 4 is a flowchart showing the recording interruption/restart operation, FIG. 5 is a schematic diagram illustrating the state of the input buffer 21 during the recording interruption/restart operation, and FIG. 6 is a timing chart illustrating data during the recording interruption/restart operation. In the flowchart shown in FIG. 4, it is assumed that the normal recording of the audio data $D_{AI}$ has already been executed by the information recording apparatus 1.

In the recording interruption/restart operation of the first embodiment, first of all, it is determined whether or not the information recording interruption instruction is inputted to the operation unit 9 and the sub-CPU 24 recognized it by the control signal C1 through the central processing unit 8 (step S1). If the recording interruption is not instructed (step S1: No), the recording is continued (step S12), and then it is determined whether or not all audio data $D_{AI}$ has been recorded (step S13). If all audio data $D_{AI}$ has already been recorded (step S13; Yes), the process ends. If all audio data $D_{AI}$ has not been recorded yet (step S13: No), then the process returns to step S1 to continue normal recording. During the normal recording, the input buffer memory 21 and the output buffer memory 23 operate as described with reference to FIG. 3.

On the other hand, if the recording interruption instruction is recognized by the sub-CPU 24 (step S1: Yes), then the position of the input pointer P within the input buffer memory 21 at the timing of the recognition of the interruption instruction is stored in the sub-CPU 24 as the pointer signal $C_{PT}$ (step S2). More specifically, if the sub-CPU 24 detects the recording interruption instruction during the accumulation of the processed data $D_{MD}$ into the buffer block 21b as shown at the leftmost position of FIG. 5, for example, the position of the input pointer P at that time is stored in the sub-CPU 24. After the position of the input pointer P is stored in step S2, then the fade-out processing is applied onto the audio data $D_{AI}$ inputted to the processing unit 20 after the recording interruption timing (step S3), and the processed data $D_{MD}$ after the fade-out processing (hereinafter simply referred to as "fade-out processed data $D_{MDO}$") is accumulated in the blank area of the input buffer memory 21. In this example, as shown in second left position of FIG. 5, the fade-out processed data $D_{MDO}$ is accumulated at the area in the buffer block 21b where the processed data DMD has been accumulated until that time, and the position of the input pointer P is updated to be the leading accumulating position of the fade-out processed data $D_{MDO}$.

During the execution of the fade-out processing in step S3, it is continuously monitored whether or not the level of the fade-out processed data $D_{MDO}$ becomes zero (step S4). If it is not zero (step S4; No), the fade-out processing is continued. On the other hand, if the level becomes zero (step S4; Yes), the input of the audio data $D_{AI}$ to the processing unit 20 is stopped (interrupted) (step S5), and then the position of the input pointer P after the accumulation of the fade-out processed data $D_{MDO}$ is completed is stored in the sub-CPU 24 again (step S6, see. second left position of FIG. 5). Then, the position of the input pointer P is returned (i.e., rewound (step S7, see. second right position of FIG. 5)) to the position at the interruption instruction timing stored in the sub-CPU 24 (see. step S2), and the process goes into the pause state after the recording interruption (step S8).

During the pause state after interruption, it is continuously monitored whether or not the information recording restart instruction is inputted to the operation unit 9 and the sub-CPU 24 recognizes it by the control signal C1 via the central processing unit 8 (step S9). If the instruction is not inputted (step S9; No), the pause state is continued (step S8). On the other hand, if the sub-CPU 24 recognizes the restart instruction (step S9; Yes), the introduction of the audio data $D_{AI}$ to be recorded after the restart into the processing unit 20 is started. Then, by referring to the position of the input pointer P at the interruption instruction timing (see. leftmost position of the FIG. 5), which is stored in the sub-CPU 24, and the position of the input pointer P at the completion of the fade-out processing (see. second left position of FIG. 5), the sub-CPU 24 discards the audio data $D_{AI}$ corresponding to the processed data $D_{MD}$ to be stored in the area in the input buffer memory 21 from the position of the input pointer P at the interruption instruction timing to the position of the input pointer P at the fade-out processing completion timing (step S10).

Then, the processing unit 20 applies fade-in processing onto the audio data $D_{AI}$ corresponding to the processed data $D_{MD}$ to be stored in the area in the input buffer memory 21 after the position of the input pointer P at the fade-out processing completion timing (step S1), and the processed data $D_{MD}$ after the fade-in processing (hereinafter simply referred to as "fade-in processed data $D_{MDI}$") is stored in the area in the input buffer memory 21 after the position of the input pointer P at the fade-out processing completion timing (see. rightmost position of FIG. 5). In the example shown in FIG. 5, the fade-in processed data $D_{MDI}$ is stored into the blank area of the buffer block 21b (i.e., the blank area after the area where the fade-out processed data $D_{MDO}$ has been stored (see. second right position of FIG. 5)). When the buffer block 21b becomes full, the processed data $D_{MD}$, the fade-out processed data $D_{MDO}$ and the fade-in processed data $D_{MDI}$ are compressed together, and outputted via the output buffer memory 23 as the compressed audio data $D_{MDI}$. Then, normal recording processing is performed (steps S12 and S13).

Next, the description will be given, with reference to FIG. 6, of the level change of the processed data $D_{MD}$, the fade-out processed data $D_{MDO}$ and the fade-in processed data $D_{MDI}$, which are produced by the processing shown in FIGS. 4 and 5. First, as shown in FIG. 6, uppermost stage, the audio data $D_{AI}$ is inputted to the processing unit 20 until the recording interruption instruction is inputted to the operation unit 9, and this state is continued until the timing at which the fade-out processing of the fade-out processed data $D_{MDO}$ is completed. Then, as shown in the second stage in FIG. 6, out of the audio data $D_{AI}$ successively inputted, the audio data $D_{AI}$ inputted after the interruption instruction timing is processed to be the fade-out processed data $D_{MDO}$ and stored in the input buffer memory 21 (see. steps S3 and S4). On the other hand, after recording restart instruction is inputted to the operation unit 9, as shown in the uppermost stage of FIG. 6, the audio data $D_{AI}$ to be recorded after the recording restart is successively inputted to the processing unit 20. Thereafter, as shown at the third stage of FIG. 6, out of the audio data $D_{AI}$ successively inputted after the recording restart, the audio data $D_{AI}$ corresponding to the time period from the interruption instruction timing until the timing at which the fade-out processed data $D_{MDO}$ becomes zero level is discarded by the processing unit 20 (see. step S10 in FIG. 4). Then, the audio data $D_{AI}$ inputted after the timing at which the fade-out processed data $D_{MDI}$ becomes zero level is processed to be the fade-in processed data $D_{MDI}$ and is stored in the input buffer 21 (see. step S11). Then, the audio data inputted after the fade-in processed data $D_{MDI}$ is stored in the input buffer memory 21 is processed to be the processed data $D_{MD}$ like the manner of the normal recording processing, and is then accumulated in the input buffer memory 21.

Next, the reproduction level change of the processed data $D_{MD}$ (and the fade-out processed data $D_{MDO}$ and the fade-in processed data $D_{MDI}$) recorded on the optical disc 2 by the processing shown in FIGS. 4 and 5 will be studied. When the processed data $D_{MD}$ including and around the recording interruption/restart timing is reproduced, the reproduction level keeps a constant level until the recording interruption as shown in the second stage from the bottom in FIG. 6. During the time period corresponding to the fade-out processed data $D_{MDO}$ after the recording interruption timing, the reproduction level is fading out and the reproduction is interrupted. On the other hand, during the time period corresponding to the fade-in processed data $D_{MDI}$ after the recording restart timing, the reproduction level is fading in and the reproduction is restarted. The recording of the compressed video data $DP_{VT}$, which is recorded on the optical disc 2 together with the compressed audio data $DP_{AI}$ corresponding to the processed data $D_{MD}$, is interrupted immediately after the recording interruption instruction, and is restarted immediately after the recording restart instruction.

In this first embodiment, the introduction of the audio data $D_{AI}$ into the input buffer memory 21 after the recording restart is restarted at the recording restart timing. Then, after the audio data $D_{AI}$ corresponding to the fade-out processed data $D_{MDO}$ is discarded, and the recording of the compressed audio data $DP_{AI}$ generated by fade-in processing is restarted. Hence, the introduction of the audio data $D_{AI}$ and the video data $D_{VI}$, timely corresponding to each other, are simultaneously restarted. Thus, the compressed audio data $DP_{AI}$ and the compressed video data $DP_{VI}$ are not recorded with being shifted from each other on the time basis, and recorded according to the common time information. Therefore, it is possible to avoid the situation that the corresponding compressed audio data $DP_{AI}$ and the compressed video data $DP_{VI}$ are reproduced with time shift or that there is no common time information.

As described above, according to the operation of the audio compression circuit 13 of the first embodiment, the storage position in the input buffer memory 21 of the processed data $D_{MD}$ corresponding to the interruption timing is stored, and the recording of the processed data is restarted based on the stored position. Therefore, when the processed data $D_{MD}$ recorded before and after the interruption/restart is reproduced, the continuity can be maintained. Further, since the recording is restarted based on the storage position of the processed data $D_{MD}$ inputted at the interruption instruction timing, the recording can be performed with more accurately maintaining the continuity of the processed data at the reproduction time.

Further, since the recording is interrupted after the processed data $D_{MD}$ after the interruption timing has been faded out, when the processed data $D_{MD}$ recorded before and after the interruption timing is reproduced, it is possible to avoid noise generation due to the sudden decrease of the recording level at the time of recording interruption. Still further, no other processed data $D_{MD}$ is recorded over the processed data $D_{MD}$ to be recorded before the interruption after the actual recording interruption of the processed data $D_{MD}$, the noise may be more effectively suppressed when the processed data recorded before and after the interruption timing is reproduced. Still further, since the recording of the processed data $D_{MD}$ is restated after the fade-in, when the processed data $D_{MD}$ recorded before and after the interruption/restart timing is reproduced, the noise generation due to the sudden increase of the recording level at the time of recording restart may be avoided. Furthermore, the above-mentioned processing is applied to the audio data $D_{AI}$ to be recorded together with the video data $D_{VI}$. Therefore, it is possible to avoid the time shift between the video data $D_{VI}$ and the audio data $D_{AI}$ at the time of reproduction when the recording of the audio data $D_{AI}$ is interrupted and restarted, and it is possible to interrupt and restart the recording of the video data $D_{VI}$ and the audio data $D_{AI}$ with maintaining the continuity thereof.

[II] 2nd Embodiment

Figure 7:
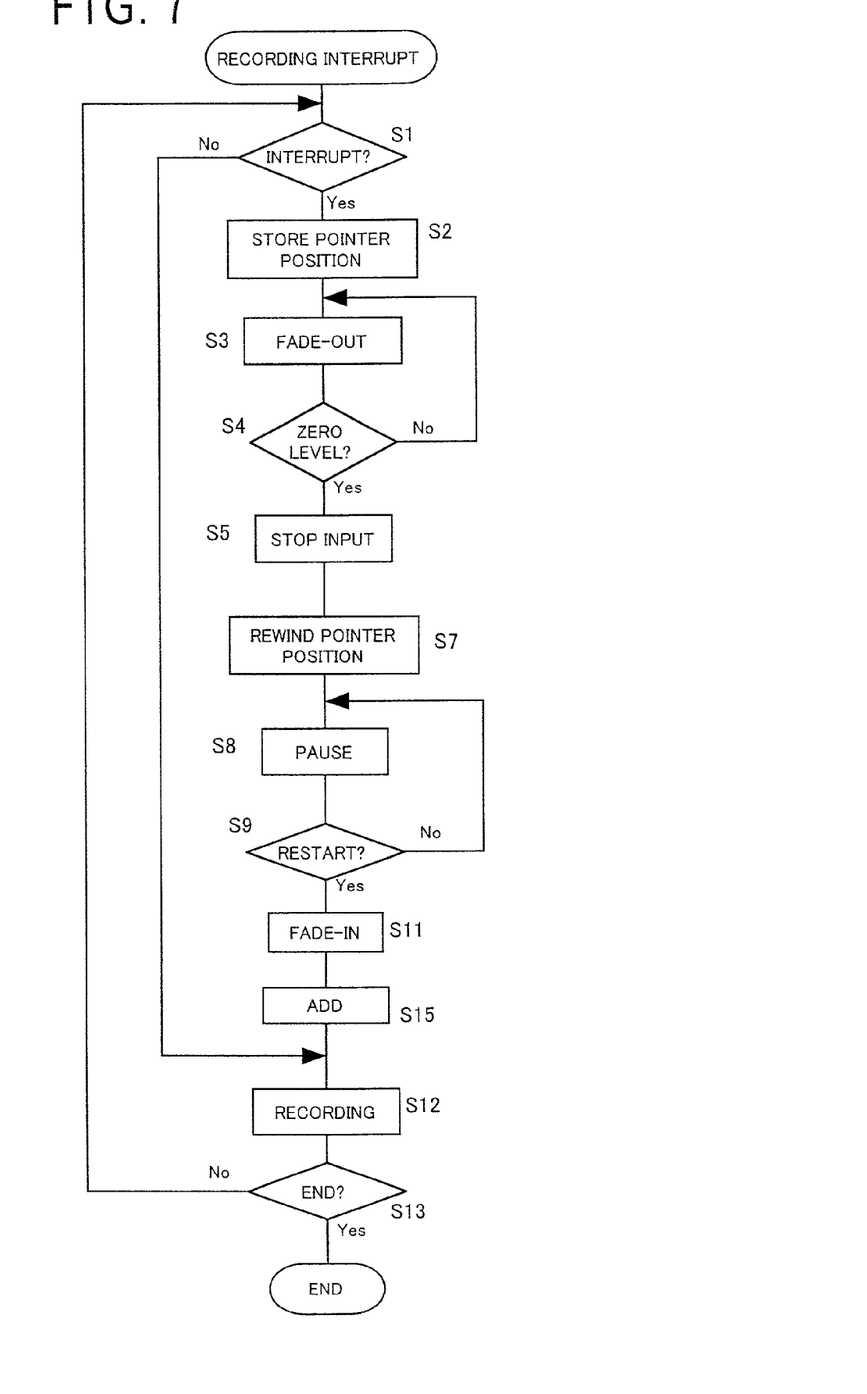
FIG. 7 is a flowchart showing the recording interruption/restart operation.
Figure 8:
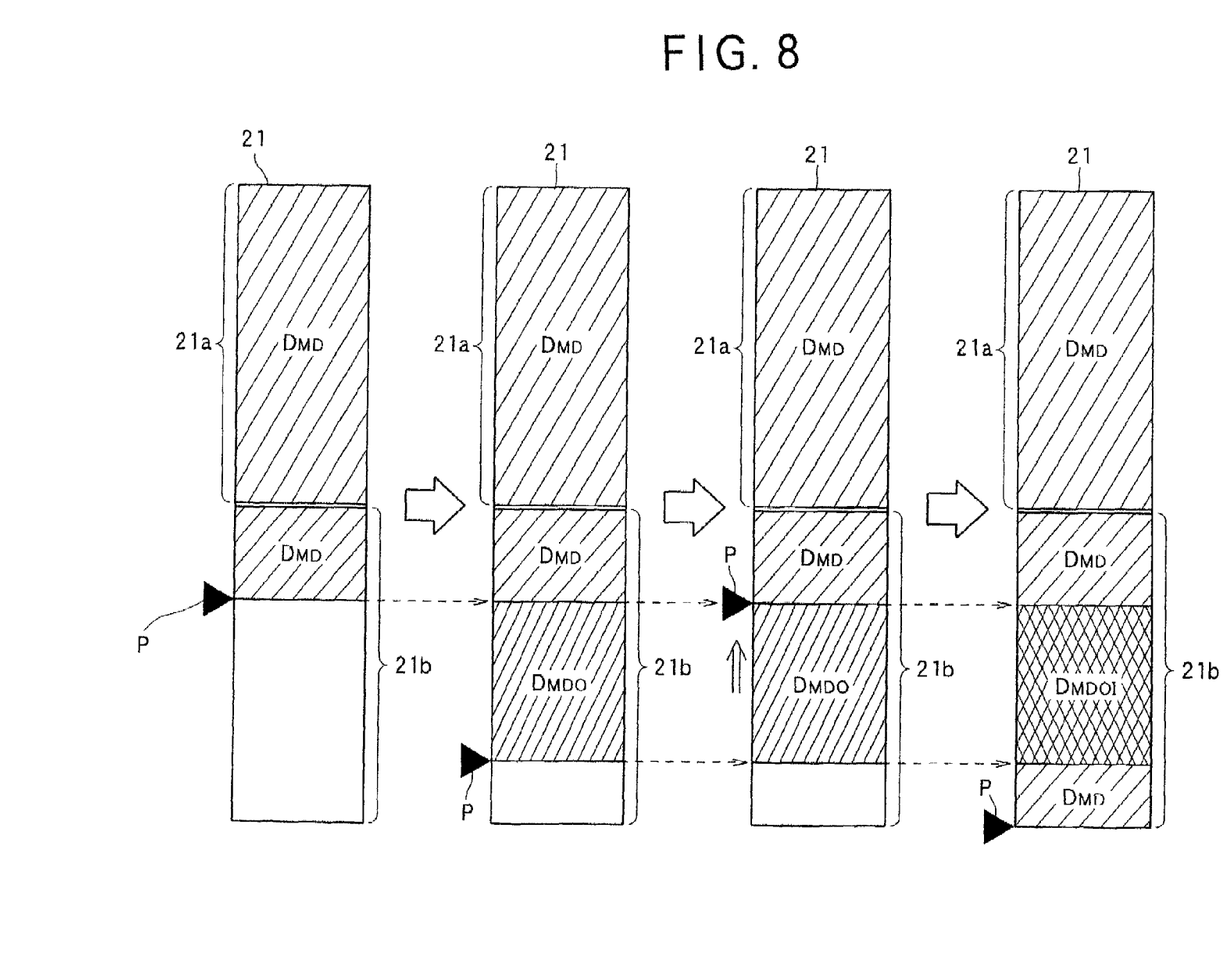
FIG. 8 is a schematic diagram showing the state of the input buffer during the recording interruption/restart operation.
Figure 9:
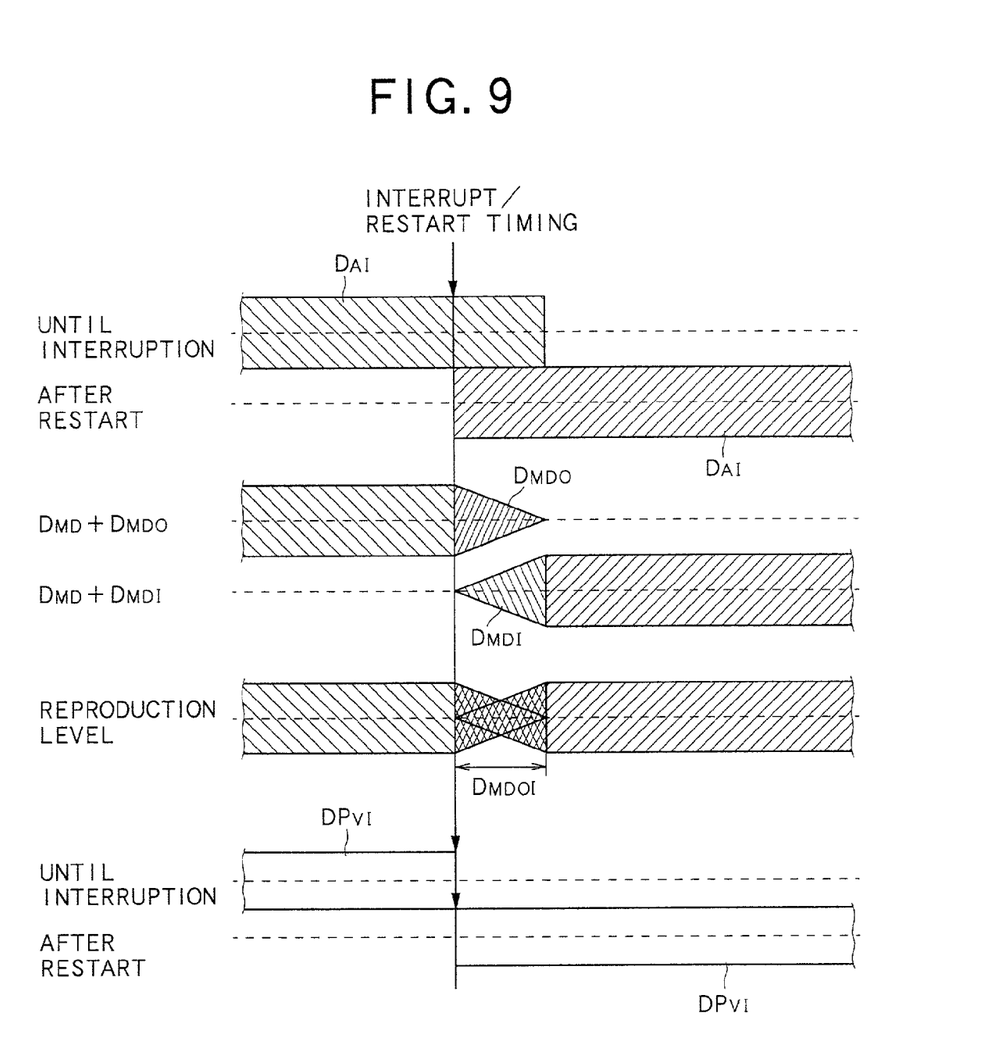
FIG. 9 is a timing chart showing data before and after the recording interruption/restart operation.

Next, the description will be given of the recording interruption/restart operation of the second embodiment with reference to FIGS. 7 to 9. FIG. 7 is a flowchart showing the recording interruption/restart operation, FIG. 8 is a schematic diagram showing the state of the input buffer 21 during the recording interruption/restart operation, and FIG. 9 is a timing chart showing data before and after the recording interruption/restart operation. Like the first embodiment, it is assumed in the flowchart shown in FIG. 7 that the normal recording of the audio data $D_{AI}$ is being executed by the information recording apparatus 1. In addition, in the flowchart shown in FIG. 7, the same steps as those in the flowchart of the recording interruption/restart operation of the first embodiment shown in FIG. 4 are represented by the same step numbers and the detailed description thereof will be omitted.

According to the recording interruption/restart operation of the first embodiment, the audio data $D_{AI}$ inputted after the recording restart and corresponding to the time period in which the fade-out processed data $D_{MDO}$ is recorded is discarded, and then the recording of the fade-in processed data $D_{MDI}$ is restarted. According to the recording interruption/restart operation of the second embodiment, the recording is restarted by so-called cross-fade after the interruption of the recording. The configuration of the information recording apparatus and the audio compression circuit required to execute the recording interruption/restart operation of the second embodiment is the same as that of the information recording apparatus 1 and the audio compression circuit 13 of the first embodiment, and hence the detailed description thereof will be omitted.

As shown in FIG. 7, in the recording interruption/restart operation of the second embodiment, first the steps S1 to S5 and steps S7 to S9, which are the same as those in the first embodiment, are executed. At this time, the position of the input pointer P after the accumulation of the fade-out processed data $D_{MDO}$ (step S6 in FIG. 4) is completed is not executed (see. second left position of FIG. 8). Then, if the recording restart instruction is recognized by the sub-CPU 24 (step S9; Yes), the introduction of the audio data $D_{AI}$ to be recorded after the restart to the processing unit 20 is started. Then, the fade-in processing is applied to all of the audio data $D_{AI}$ thus introduced from the leading portion by the processing unit 20 to produce fade-in processed data $D_{MDI}$ (step S11). Then, the position of the input pointer P at the interruption instruction timing, which is stored in the sub-CPU 24, is referred to, and the fade-out processed data $D_{MDO}$ stored after the position of the input pointer P is added to the fade-in processed data $D_{MDI}$ produced in step S11 to produce the added processed data $D_{MDOI}$, and it is stored in the area of the input buffer memory 21 to be stored after the position of the input pointer P at the interruption instruction timing (step S15, see. rightmost position in FIG. 8). At this time, in the case of FIG. 8, the added processed data $D_{MDOI}$ is stored at the area in the buffer block 21b where the fade-out processed data $D_{MDO}$ is stored.

Then, the normal storing processing including the generation of the normal processed data $D_{MD}$ and the storage of the processed data $D_{MD}$ into the input buffer memory 21 are executed (steps S12 and S13). At this time, the normal processed data $D_{MD}$ is stored in the blank area of the buffer block 21b (i.e., the blank area subsequent to the area where the added processed data $D_{MDOI}$ has been stored) (see. rightmost position of FIG. 8). When the buffer block 21b becomes full (see. rightmost position of FIG. 8), the processed data $D_{MD}$ and the added processed data $D_{MDOI}$ are compressed together and is outputted as the compressed audio data $DP_{AI}$ via the buffer memory 23. Then, the above described normal recording processing is executed.

Next, the level change of the processed data $D_{MD}$ and the added processed data $D_{MDOI}$ produced by the processing shown in FIGS. 7 and 8 will be described with reference to FIG. 9. First, as shown in the upper stage of FIG. 9, until the recording interruption instruction is inputted to the operation unit 9, the audio data $D_{AI}$ is continuously inputted to the processing unit 20 like the first embodiment, and this state is continued until the fade-out processing of the fade-out processed data $D_{MDO}$ ends. Then, as shown at the second stage of FIG. 9, out of the audio data $D_{AI}$ continuously inputted, the audio data $D_{AI}$ inputted after the interruption instruction timing is processed to be the fade-out processed data $D_{MDO}$ and stored in the input buffer memory 21 (see. step S3).

On the other hand, after the recording restart instruction is inputted to the operation unit 9, the audio data $D_{AI}$ to be recorded after the recording restart is continuously inputted to the processing unit 20. Thereafter, as shown in the third stage of FIG. 9, the audio data $D_{AI}$ continuously inputted after the recording restart is processed to be the fade-in processed data $D_{MDI}$ and added to the fade-out processed data $D_{MDO}$ in the input buffer memory 21. Thus, the added processed data $D_{MDOI}$ is generated and stored in the buffer memory 21 (see. FIG. 7, steps S11 and S15). Then, the audio data $D_{AI}$ inputted after the added compressed data $D_{MDOI}$ is processed to be the processed data $D_{MD}$ and is accumulated in the input buffer memory 21.

Next, the reproduction level change of the processed data $D_{MD}$ (and the added processed data $D_{MDOI}$) recorded on the optical disc 2 by the processing shown in FIGS. 7 and 8 will be studied. When the processed data $D_{MD}$ including the recording interruption/restart timing and recorded before and after the timing is reproduced, the reproduction level keeps a substantially constant level until the recording interruption, as shown at the second stage from the bottom of FIG. 9. During the time period corresponding to the added processed data $D_{MDOI}$ after the recording interruption timing, the fade-in is started before the reproduction level fades out to reach the completely zero level, and then the reproduction level recovers to the level corresponding to the normal processed data $D_{MD}$ and then becomes constant level. At this time, the recording of the compressed video data $DP_{VT}$ recorded together with the compressed audio data $DP_{AI}$ corresponding to the processed data $D_{MD}$, is interrupted immediately after the recording interruption instruction, and the recording is restarted immediately after the recording restart instruction.

In the second embodiment, the introduction of the audio data $D_{AI}$ to the input buffer 21 after the recording restart is started simultaneously with the recording restart timing, and the recording of the processed data $D_{MD}$ is restarted after the added processed $D_{MDOI}$ is recorded. As a result, like the case of the first embodiment, the recording of the compressed audio data $DP_{AI}$ and the compressed video data $DP_{VT}$ are simultaneously restarted. Thus, the compressed audio data $DP_{AI}$ and the compressed video data $DP_{VT}$, are not recorded in a manner being shifted from each other on the time axis, but are recorded according to the common time information. Therefore, at the time of reproduction, it is possible to avoid that the compressed audio data $DP_{AI}$ and the compressed video data $DP_{VT}$ are reproduced with time shift and that there is no common time information.

As described above, according to the operation of the audio compression circuit 13 of the second embodiment, the storage position in the input buffer memory 21 of the processed data $D_{MD}$ corresponding to the interruption timing is stored, and the recording of the processed data is restarted based on the stored position. Therefore, when the processed data $D_{MD}$ recorded before and after the interruption/restart is reproduced, the continuity can be maintained. Further, since the recording is restarted based on the storage position of the processed data $D_{MD}$ inputted at the interruption instruction timing, the recording can be performed with more accurately maintaining the continuity of the processed data at the reproduction time.

Further, since the recording is restarted from the added processed data $D_{MDI}$ produced from the audio data $D_{AI}$ to be recorded after the interruption instruction timing, both the fade-out processed data $D_{MDO}$ and the fade-in processed data $D_{MDI}$ are recorded in an overlapped manner during the period after the interruption instruction timing until the actual interruption of the recording. Therefore, when the processed data $D_{MD}$ recorded before and after the interruption/restart timing is reproduced, it is possible to avoid that the reproduction level becomes zero and the reproduction is broken. Still further, since the recording interruption and the recording restart of the processed data $D_{MD}$ is executed by so-called cross-fade, when the processed data $D_{MD}$ recorded before and after the recording interruption/restart timing is reproduced, it is possible to avoid noise generation due to the sudden decrease or increase of the recording level of the processed data $D_{MD}$ at the interruption/restart timing.

Furthermore, the above-mentioned processing is applied to the audio data $D_{AI}$ to be recorded together with the video data $D_{VT}$. Therefore, it is possible to avoid the time shift between the video data $D_{VT}$ and the audio data $D_{AI}$ at the time of reproduction when the recording of the audio data $D_{VT}$ is interrupted and restarted, and it is possible to interrupt and restart the recording of the video data $D_{VT}$ and the audio data $D_{AI}$ with maintaining the continuity thereof.

The above description is directed to the case where the video data $D_{VT}$ and the audio data $D_{AI}$, corresponding to each other on the time axis, are recorded on a single optical disc 2. Alternatively, the present invention may be applied to the case where other audio data timely corresponding to the audio data $D_{AI}$ is recorded on the optical disc 2 together with the audio data $D_{AI}$. In this case, the compression processing is applied onto the other audio data, instead of the video data $D_{VT}$. Further, the present invention is applicable to the case where the audio data $D_{AI}$ is recorded onto information storage medium of other type than the optical disc, e.g., tape or the like.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.11-217321 filed on Jul. 30, 1999 including the specification, claims, drawings and summary is incorporated herein by reference in its entirety.

What is claimed is:

1. An information recording apparatus comprising:
    a processing unit for processing recording information to be recorded and for generating processed information;
    a storage unit for temporarily storing the processed information;
    a recording unit for recording the processed information onto an information storage medium;
    a position storing unit for storing, at a time of interrupting recording of the processed information, an interruption storage position which is a storage position in the storage unit of the processed information corresponding to a timing at which interruption is instructed;
    an interrupting unit for interrupting recording of the processed information after storing the interruption storage position; and
    a restart unit for restarting the recording of the processed information based on the stored interruption storage position, wherein the processing unit fades out the recording information after the interruption instruction timing to generate the processed information, wherein the storage unit stores the generated processed information onto an area in the storage unit where the processed information is to be stored after the interruption instruction timing, and wherein the interrupting unit reads out the fading-out processed information from the storage unit and stores the processed information onto the information storage medium, and then interrupts the recording of the processed information.

2. The information recording apparatus according to claim 1, wherein the position storing unit stores the storage position in the storage unit of the processed information inputted to the storage unit at an interruption instruction timing as the interruption storage position.

3. The information recording apparatus according to claim 1, wherein the restart unit restarts, after the interruption instruction timing, the recording of the processed information from restart processed information which is the processed information to be recorded after the recording of the processed information is interrupted.

4. The information recording apparatus according to claim 3, wherein the restart unit restarts the recording of the processed information by fading in the restart processed information to be recorded on the information storage medium.

5. The information recording apparatus according to claim 1, wherein the restart unit restarts the recording of the processed information from interruption processed information which is to be recorded after the interruption instruction timing.

6. The information recording apparatus according to claim 5, wherein the restart unit restarts the recording of the processed information by fading in the interruption processed information to be recorded on the information storage medium.

7. The information recording apparatus according to claim 1, wherein the recording information is audio information which is to be recorded on the information storage medium together with corresponding video information.

* * * * *